United States Patent
Sato et al.

(10) Patent No.: US 9,233,410 B2
(45) Date of Patent: Jan. 12, 2016

(54) TREATMENT METHOD FOR STAMPING TOOL SURFACE

(71) Applicant: Japan Aviation Electronics Industry, Limited, Tokyo (JP)

(72) Inventors: Akinobu Sato, Tokyo (JP); Akiko Suzuki, Tokyo (JP); Takeshi Kawano, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 418 days.

(21) Appl. No.: 13/888,706

(22) Filed: May 7, 2013

(65) Prior Publication Data

US 2013/0240760 A1   Sep. 19, 2013

Related U.S. Application Data

(62) Division of application No. 12/878,403, filed on Sep. 9, 2010, now Pat. No. 8,683,901.

(51) Int. Cl.
*B21D 37/20* (2006.01)
*B26F 1/14* (2006.01)
(Continued)

(52) U.S. Cl.
CPC .............. *B21D 37/205* (2013.01); *B21D 37/20* (2013.01); *B23K 15/08* (2013.01); *B26D 7/088* (2013.01); *B26F 1/14* (2013.01); *G21K 5/02* (2013.01); *C23F 4/00* (2013.01); *Y10T 83/263* (2015.04); *Y10T 83/929* (2015.04); *Y10T 83/9437* (2015.04)

(58) Field of Classification Search
CPC .............. B26F 1/14; B26D 7/088; C23F 4/00; B23K 15/08; Y10T 83/263; Y10T 83/9428; Y10T 83/9437; B21D 37/205; G21K 5/02

USPC .......... 76/107.1; 83/169, 690, 686; 29/898.13
See application file for complete search history.

(56) References Cited

U.S. PATENT DOCUMENTS

| 2,373,871 A | 4/1945 | Connor et al. |
| 5,363,557 A | 11/1994 | Thompson et al. |

(Continued)

FOREIGN PATENT DOCUMENTS

| CN | 101155901 | 4/2008 |
| JP | 07-018403 | 1/1995 |

(Continued)

OTHER PUBLICATIONS

Second office action issued May 23, 2013 for corresponding Chinese patent application No. 201010273407.3.
(Continued)

*Primary Examiner* — Kenneth E Peterson
(74) *Attorney, Agent, or Firm* — Greenblum & Bernstein, P.L.C.

(57) ABSTRACT

To enable fabrication of a precise stamped product having an extremely low surface roughness. Ripples 24 having depths ranging from 10 to 100 nm are formed with periodicities ranging from 100 to 1000 nm on a stamping tool surface that comes into contact with a workpiece material. The ripples 24 have a stripe shape extending in a direction substantially perpendicular to the direction of sliding between the stamping tool (die 21) and the workpiece material (the direction of the arrow a). The ripples 24 serve as micro pools. For example, a product that is required to have a surface roughness of the order of several tens of nm or lower can be satisfactorily stamped.

2 Claims, 4 Drawing Sheets

(51) Int. Cl.
*B26D 7/08* (2006.01)
*B23K 15/08* (2006.01)
*G21K 5/02* (2006.01)
*C23F 4/00* (2006.01)

(56) References Cited

U.S. PATENT DOCUMENTS

| | | | |
|---|---|---|---|
| 5,629,099 | A | 5/1997 | Sakurai et al. |
| 6,537,045 | B2 | 3/2003 | Riegger et al. |
| 7,543,385 | B2 | 6/2009 | Kaminski et al. |
| 8,596,105 | B2 * | 12/2013 | Ito ............... B23P 15/16 29/432 |
| 8,683,901 | B2 * | 4/2014 | Sato ............... B21D 37/20 83/169 |
| 2002/0073548 | A1 | 6/2002 | De Vries et al. |
| 2006/0278611 | A1 * | 12/2006 | Sato ............... H01J 37/08 216/66 |

FOREIGN PATENT DOCUMENTS

| | | |
|---|---|---|
| JP | 2000-149339 | 5/2000 |
| JP | 2000-1149339 | 5/2000 |
| JP | 2008-055426 | 3/2008 |
| JP | 2009-108368 | 5/2009 |

OTHER PUBLICATIONS

Office Action issued on Jun. 26, 2012 by the Taiwan Intellectual Property Office for corresponding foreign patent application No. TW 099131241.

First office action issued on Oct 25, 2012 by the Chinese patent office for corresponding foreign patent application No. CN 201010273407.3.

* cited by examiner

TREATMENT METHOD FOR STAMPING TOOL SURFACE

This is a divisional application of U.S. patent application Ser. No. 12/878,403, filed 9 Sep. 2010, now U.S. Pat. No. 8,683,901.

TECHNICAL FIELD

The present invention relates to a stamping tool for metal stamping and a treatment method for a stamping tool surface.

BACKGROUND ART

In order to prevent occurrence of a burr on the product or otherwise improve the quality of metal stamping or to improve the durability of the stamping tool, such as a punch and a die, it is essential to reduce the friction at the friction interface during metal stamping. The workpiece material (metal material) has irregularities on the surface to a greater or lesser extent. The lubricant (lubricating oil) applied to the material before metal stamping is accumulated in the recesses forming the irregularities. If there is no clearance between the stamping tool and the material into which the lubricant can escape when the stamping tool and the material come into contact with each other, the lubricant is mechanically sealed in the recesses and introduced to the friction interface. The introduction mechanism is expected to work in all plastic working.

It has been confirmed that, if the surface of the material or stamping tool is previously roughened by acid corrosion, shot peening, sand blast or the like to make the use of the effect of the lubricant, the frictional force decreases, and galling or seizing can be prevented. The part in which the lubricant is sealed is referred to as a micro pool in the field of plastic working. In working, high hydrostatic pressure builds up in the lubricant in the micro pool and makes a contribution to the pressure at the worked surface. In this state, wear of the stamping tool surface is reduced. Therefore, it is important to condition the stamping tool surface to have a roughness with which high hydrostatic pressure occurs in the lubricant in the micro pool.

For example, Patent Literature 1 discloses an art that achieves high stampability by conditioning the surface of an alloy material by heat treatment to form micro pools. Patent Literature 2 discloses an art that improves the working precision and elongates the life of the stamping tool by spraying hard particles onto the stamping tool surface to harden the stamping tool surface and form micro pools.

Patent Literature 1: Japanese Patent Application Laid-Open No. H07-18403
Patent Literature 2: Japanese Patent Application Laid-Open No. 2008-55426

DISCLOSURE OF THE INVENTION

Problems to be Solved by the Invention

As described above, according to the arts disclosed in Patent Literatures 1 and 2, micro pools are formed by simple heat treatment or blasting. The micro pools formed by these methods have a size of the order of several μm to several tens of μm in width and depth.

However, stamping tools used for precise metal stamping of a small connector or other electronic device component are sometimes required to have submicron dimensional precision and a surface roughness of the order of several tens of nm or lower. So far, the effect of the micro pools on the metal stamping under the condition that the surface roughness is on the order of several tens of nm or lower, that is, the depth of the recesses ranges from about 10 to 100 nm, has not been adequately considered and explained.

In addition, the conventional methods of forming micro pools have a serious problem that the surface roughness is too high, so that the methods can be applied to parts that are required to have a surface roughness of the order of several tens of nm or lower. Although using lithography used in the semiconductor or other fields to form fine micro pools can be contemplated, it is practically difficult to apply lithography to the three-dimensional surface of the stamping tool. Thus, there is currently no method of efficiently forming micro pools under the condition that a surface roughness of the order of several tens of nm or lower is required.

Furthermore, if the conventional methods are used to form micro pools on the surface of a sharp edge of a stamping tool having a radius of curvature of about several μm, for example, the edge is blunted, resulting in poorly shaped products. The formation of micro pools on the surface of a sharp edge has been another difficult problem.

An object of the present invention is to provide a highly durable stamping tool that can satisfactorily and precisely stamp a product that is required to have a surface roughness of the order of several tens of nm or lower, for example. Another object of the present invention is to provide a treatment method for a stamping tool surface of the stamping tool, and in particular, a treatment method capable of forming a fine micro pool on the surface of an edge of the stamping tool.

Means to Solve the Problems

A stamping tool for metal stamping according to the present invention has ripples having depths ranging from 10 to 100 nm formed with periodicities ranging from 100 to 1000 nm on a stamping tool surface that comes into contact with a workpiece material, and the ripples have a stripe shape extending in a direction substantially perpendicular to the direction of sliding between the stamping tool and the workpiece material.

In a treatment method for a stamping tool surface of a stamping tool for metal stamping that comes into contact with a workpiece material according to the present invention, the stamping tool surface is irradiated with a gas cluster ion beam in a direction substantially parallel to the direction of sliding between the stamping tool and the workpiece material.

Effects of the Invention

The stamping tool according to the present invention can satisfactorily achieve fine and precise metal stamping of a product that is required to have a surface roughness of the order of several tens of nm or lower.

In addition, the treatment method for a stamping tool surface according to the present invention can efficiently form fine micro pools even on the surface of an edge of the stamping tool, thereby enabling fabrication of a precise stamped product.

DETAILED DESCRIPTION OF THE PREFERRED EMBODIMENTS

Figure 1:
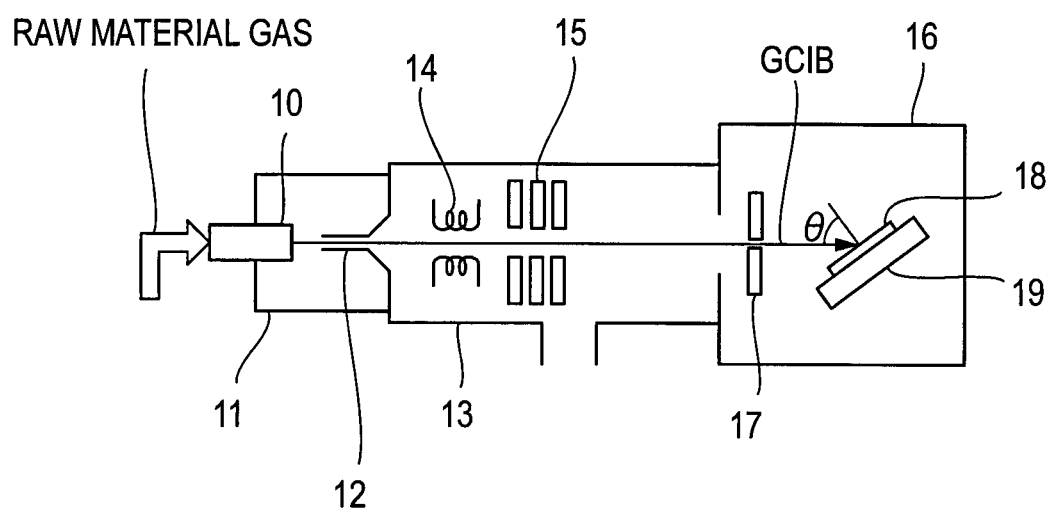
FIG. 1 is a diagram showing a basic configuration of a gas cluster ion beam apparatus used in a treatment method for a stamping tool surface according to the present invention.

First, a principle and an operation of the present invention will be described.

Materials have fine projections and recesses on the surface. If no clearance is formed between a stamping tool and a material when the stamping tool and the material come into contact with each other, a lubricant in the recesses is mechanically sealed in the recesses and introduced to the friction interface. The introduction mechanism is particularly effective when a lubricant having low viscosity is used. As well known, if the material surface is previously roughen by acid corrosion, shot peening, sand blast or the like, the friction decreases.

However, even if a large amount of lubricant is introduced to the friction interface, a continuous fluid film of the lubricant is seldom formed over the entire friction surface. Therefore, the stamping tool and the material are partially in solid-solid contact with each other and partially in contact with each other with a micro pool surrounded by the solid-solid contact parts interposed therebetween. In the solid-solid contact parts, the boundary lubrication is dominant, and therefore, the lubricant used has to have an extremely high boundary lubricity to prevent occurrence of a metallic bond between the stamping tool and the metal material. On the other hand, a metal seal is formed by the contact between the stamping tool and the material at the circumference of the micro pool, and the lubricant is sealed in the micro pool by the metal seal.

The behavior of the lubricant in the micro pool is a characteristic of the metal stamping using the lubricant. That is, as the working progresses, high pressure builds up in the lubricant in the micro pool and makes a contribution to the pressure at the worked surface. In particular, as the difference between the pressure at the flat part and the pressure of the lubricant in the micro pool decreases as the working progresses, the lubricant in the micro pool becomes able to flow onto the flat part in the boundary lubricant state. This behavior of the lubricant is referred to as a micro pool mechanism. If the mechanism effectively works, the friction can be significantly reduced.

As a result of keen examination, the inventor has first found that the following conditions are important to make the micro pool mechanism effectively work. A first condition is that the stamping tool has irregularities that form micro pools at the edge part thereof to which a high shearing stress is applied. A second condition is that the stamping tool has recesses and projections extending substantially perpendicularly to the direction of sliding between the stamping tool and the workpiece material stamped in the stamping tool.

From the first condition, it is inferred that the sharpness of the edge part of the stamping tool, that is, the sharpness of the blade part that cuts the workpiece material is extremely important in metal stamping. And a possible reason for the second condition, that is, why the grooves perpendicular to the direction of sliding are more preferred than the conventional holes as the shape of the micro pools is that the hydrostatic pressure occurring in a stripe configuration provides a significantly higher hydrodynamic lubrication than the hydrostatic pressure occurring in a dot-like configuration.

The inventor has first found that the configuration described above can be formed on the stamping tool surface by irradiating the stamping tool surface with a gas cluster ion beam (GCIB) in the direction substantially parallel to the direction of sliding between the stamping tool and the workpiece material stamped in the stamping tool. Since the gas cluster ion beam is a beam, it can be focused on the edge part of the stamping tool at which the workpiece material slides. In addition, the edge part of the stamping tool microscopically has a curvature (R-shaped), so that if the gas cluster ion beam is applied in the direction substantially parallel to the direction of sliding between the stamping tool and the workpiece material stamped in the stamping tool, the edge part is naturally irradiated with the beam at an angle. By applying the gas cluster ion beam at an appropriate angle of incidence, typically ranging from about 20 to 60 degrees, more preferably from about 40 to 60 degrees, fine recesses and projections can be formed on the surface in a strip configuration. In this specification, the fine recesses and projections in the strip configuration are referred to as ripples.

As an alternative to the mechanism that involves the lubricant applied to produce a hydrostatic pressure when the stamping tool and the workpiece material slide with each other, a mechanism that causes adsorption of moisture in the normal atmosphere on the surfaces of the stamping tool and the workpiece material to form a film to produce a hydrostatic pressure is also possible.

By the processes described above, micro pools can be extremely efficiently formed on the stamping tool surface.

In the following, examples of the present invention will be described.

First, a basic configuration of a gas cluster ion beam apparatus used to treat a stamping tool surface in the present invention will be described with reference to FIG. 1.

A raw material gas is ejected through a nozzle 10 into a vacuum cluster forming chamber 11, where the gas molecules aggregate to form a cluster. The cluster is introduced as a gas cluster beam into an ionizing chamber 13 through a skimmer 12. In the ionizing chamber 13, an ionizer 14 irradiates the neutral cluster with an electron beam, such as thermoelectron, to ionize the neutral cluster. The ionized gas cluster beam is accelerated by accelerating electrodes 15 and then enters a sputtering chamber 16. The incident gas cluster ion beam (GCIB) is regulated to a predetermined beam diameter by an aperture 17 and then applied to the surface of a sample 18. The sample 18 is mounted on a sample holder 19. The angle of irradiation θ can be adjusted by inclining the sample holder 19. In addition, although detailed illustration is omitted, the sample 18 can be vertically or horizontally moved or rotated with an X-Y stage or rotating mechanism to achieve irradiation from an arbitrary direction.

EXAMPLE 1

Figure 2A:
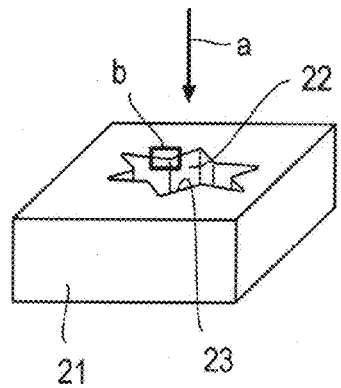
FIG. 2A is a perspective view of a stamping tool according to an example of the present invention.
Figure 3:
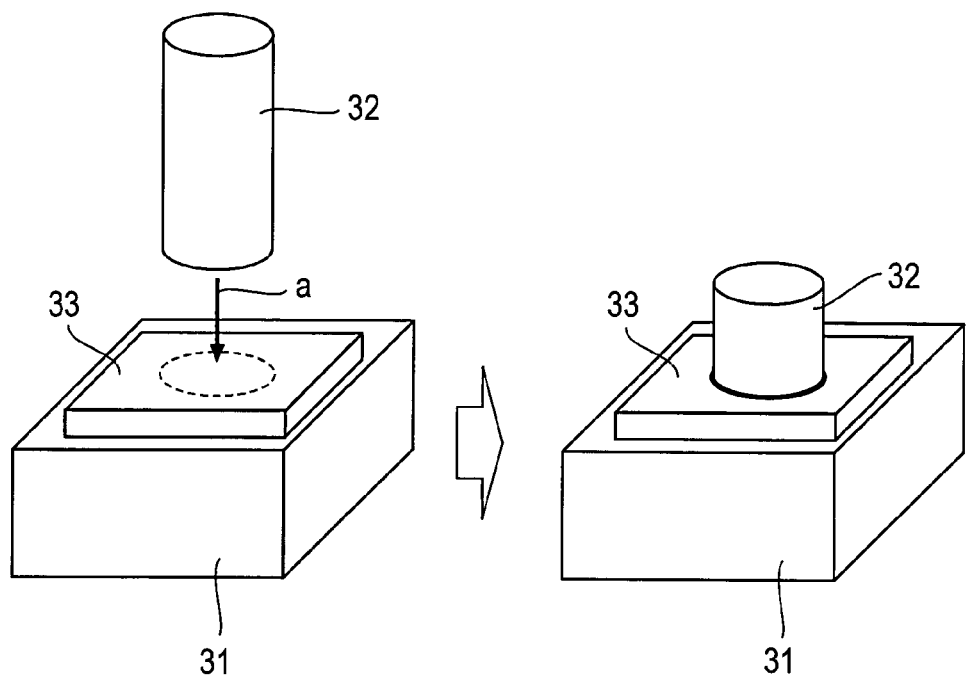
FIG. 3 is a diagram for illustrating the direction of sliding between a die and a workpiece material stamped in the die.

A die was made of V20, which is a carbide material made of tungsten carbide and cobalt (Co) as a binder, by wire electric discharge machining as shown in FIG. 2A. A die 21 had a hole 22 having a diameter of about 1 mm in the shape of a gear. The die 21 was irradiated with a gas cluster ion beam in a direction substantially parallel to the direction of sliding between the die 21 and a workpiece material stamped in the die 21. It is assumed that, in the arrangement shown in FIG. 3, the direction of sliding between the die and the workpiece material stamped in the die is the direction of the arrow a. In FIG. 3, reference numeral 31 denotes a die, reference numeral 32 denotes a punch, and a reference numeral 33 denotes a workpiece material.

Figure 2B:
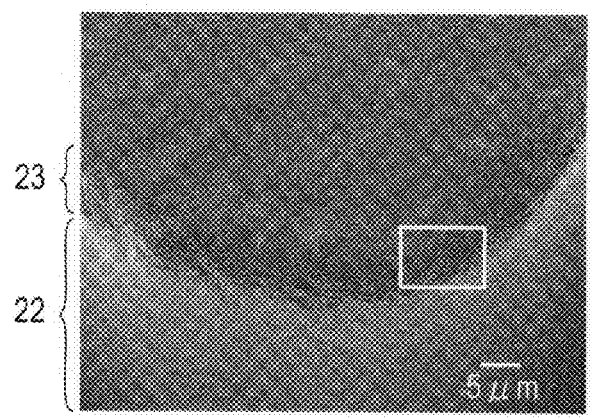
FIG. 2B is a photograph of a part b in FIG. 2A observed with a scanning electron microscope.
Figure 2C:
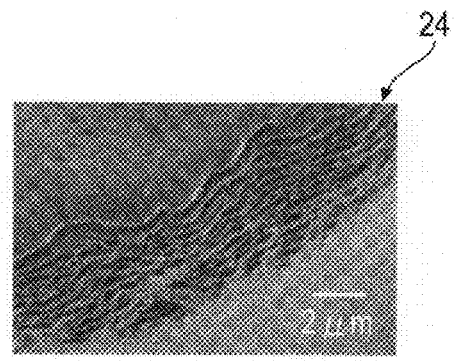
FIG. 2C is a photograph showing a part of FIG. 2b (the boxed part) in an enlarged manner.
Figure 2D:
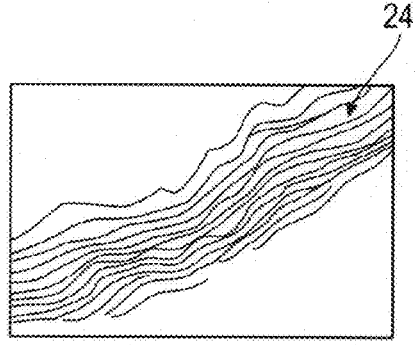
FIG. 2D is a conceptual illustration of FIG. 2C.

The die 21 was irradiated with a gas cluster ion beam in the direction of the arrow a in FIG. 2A under the conditions that the raw material gas used was argon, the acceleration voltage was 20 kV, and the irradiation does was $1.5 \times 10^{17}$ ions/cm². Then, an edge part 23 of the gear-shaped hole 22 in the die 21 was observed with a scanning electron microscope. FIG. 2B shows a result of the observation of a part b in FIG. 2A. FIG. 2C is an enlarged view of a part of FIG. 2B (the boxed part), and FIG. 2D is a conceptual illustration of FIG. 2C. As can be seen from the drawings, ripples 24 were formed in the edge part 23. It can also be seen that the ripples 24 had a stripe shape extending in the direction perpendicular to the direction of sliding between the die 21 and the workpiece material stamped in the die 21 (the direction of the arrow a). The periodicity of the ripples 24 (the distance between peaks or between valleys) ranged from about 100 to 500 nm, and the depth of the ripples ranged from about 10 to 50 nm.

The die 21 was set in a stamping machine, and micro gears were fabricated by punching a copper plate having a thickness of 1 mm with a coating of a lubricant. The lubricant used was a naphthenic mineral oil (the same lubricant was used in the other examples described later). The thickness of the fabricated micro gears (the dimension in the direction of thickness of the plate) and the surface roughness thereof, as an indicator of the degree of surface finishing, were measured with an atomic force microscope. All the fabricated micro gears had a thickness of 0.95 mm or more. And the micro gears had a mean surface roughness of 50 nm or lower and were glossy.

EXAMPLE 2

Figure 4A:
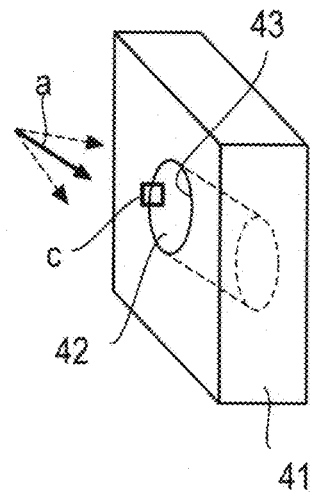
FIG. 4A is a perspective view of a stamping tool according to another example of the present invention.
Figure 4B:
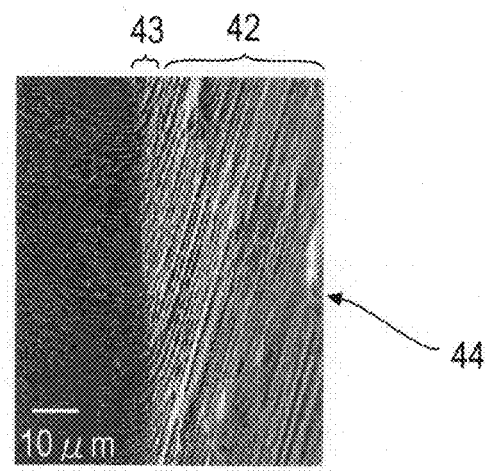
FIG. 4B is a photograph of a part c in FIG. 4A observed with a scanning electron microscope.
Figure 4C:
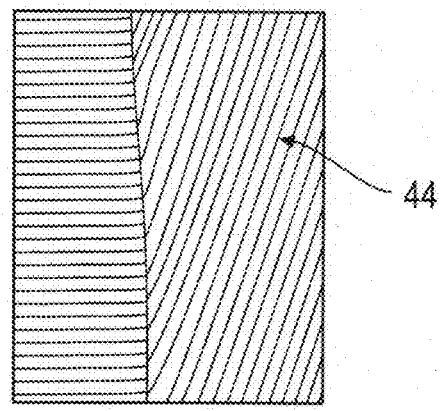
FIG. 4C is a conceptual illustration of FIG. 4B.

A die was made of SKD11, which is a stainless material, by electric discharge machining as shown in FIG. 4A. A die 41 had a hole 42 having a diameter of about 1 mm. The die 41 was irradiated with a gas cluster ion beam in the same manner as in the Example 1 except that the axis of irradiation was fluctuated in a range of ±20 degrees with respect to the direction of sliding between the die 41 and a workpiece material stamped in the die 41. Then, an edge part 43 of the hole 42 in the die 41 was observed with a scanning electron microscope. FIG. 4B shows a result of the observation of a part c in FIG. 4A, and FIG. 4C is a conceptual illustration of FIG. 4B. As can be seen from the drawings, ripples 44 are formed not only in the edge part 43 but also inside the hole 42. The periodicity of the ripples 44 ranged from about 300 to 1000 nm, and the depth of the ripples ranged from about 30 to 100 nm.

The die 41 was set in a stamping machine, and a copper plate having a thickness of 1 mm with a coating of a lubricant was punched. The punched products had a mean surface roughness of 20 nm or lower and had a mirror surface when visually examined.

EXAMPLE 3

A punch was made of V20, which is a carbide material, by grinding. The surface of the tip end of the punch had a rectangular shape having a width of 0.3 mm and a length of 2 mm. The punch was irradiated with a gas cluster ion beam in a direction substantially parallel to the direction of sliding between the punch and a workpiece material stamped by the punch. The irradiation conditions were that the raw material gas used was argon, the acceleration voltage was 20 kV, and the irradiation does was $3 \times 10^{16}$ ions/cm². Then, an edge part of the punch was observed with a scanning electron microscope. Ripples were observed in the edge part of the punch. The ripples had a stripe shape extending in the direction perpendicular to the direction of sliding between the punch and the workpiece material stamped by the punch (the direction of shearing). The periodicity of the ripples ranged from about 300 to 600 nm, and the depth of the ripples ranged from about 50 to 80 nm.

The punch was set in a stamping machine, and parts used as an electrode pin of a connector were fabricated by punching a copper plate having a thickness of 0.1 mm with a coating of a lubricant. The number of stampings until an electrode pin part having a burr on the edge part was fabricated was examined. The examination showed that no burr occurred before the number of stampings reached 4 million. In addition, almost no crack or wear occurred on the tip end of the blade of the punch.

EXAMPLE 4

A die was made of V20, which is a carbide material, by wire electric discharge machining. As in the Example 1, the die had a hole having a diameter of about 1 mm in the shape of a gear. The die was irradiated with a gas cluster ion beam by fluctuating the axis of irradiation in a range of ±20 degrees with respect to the direction of sliding between the die and a workpiece material stamped in the die. The irradiation conditions were that the raw material gas used was argon, the acceleration voltage was 15 kV, and the irradiation does was $5 \times 10^{17}$ ions/cm². Then, the edge part of the gear-shaped hole in the die was observed with a scanning electron microscope. Ripples were observed in the edge part. The periodicity of the ripples ranged from about 100 to 200 nm, and the depth of the ripples ranged from about 10 to 20 nm.

The die was set in a stamping machine, and micro gears were fabricated by punching a copper plate having a thickness of 1 mm without a coating of a lubricant in an atmosphere having a temperature of 25 degrees C. and a relative humidity of 90%. The thickness and the surface roughness, as an indicator of the degree of surface finishing, of the fabricated micro gears were measured with an atomic force microscope. All the fabricated micro gears had a thickness of 0.95 mm or more. And the micro gears had a mean surface roughness of 50 nm or lower and were glossy.

COMPARATIVE EXAMPLE 1

A die was fabricated in the same manner as in the Example 1 except that the die was not irradiated with a gas cluster ion beam. The die was set in a stamping machine, and micro gears were fabricated in the same manner as in the Example 1.

The fabricated micro gears had a thickness ranging from about 0.80 to 0.90 mm. The reason why the thickness of the micro gears decreased compared with those in the Example 1 is probably that the copper material was less slidable on the die in punching of the copper plate. Many of the micro gears had a mean surface roughness of 200 nm or more and were not glossy.

COMPARATIVE EXAMPLE 2

A punch was fabricated in the same manner as in the Example 3 except that the punch was not irradiated with a gas cluster ion beam. The punch was set in a stamping machine, and parts used as an electrode pin of a connector were by punching a copper plate as in the Example 3. The number of stampings until an electrode pin part having a burr on the edge part was fabricated was examined.

The examination showed that a burr occurred on the edge part when 300 thousand electrode pin parts were fabricated. A crack or wear was observed on the tip end of the blade of the punch when the burr was observed.

COMPARATIVE EXAMPLE 3

A die was fabricated in the same manner as in the Example 1 except that the die was irradiated with a gas cluster ion beam in a different direction. The die was irradiated in a direction at an angle of 45 degrees from the direction of sliding between the die and the workpiece material stamped in the die, rather than in the direction substantially parallel to the direction of sliding. Then, the edge part of the gear-shaped hole in the die was observed with a scanning electron microscope. Ripples were observed in the edge part. The periodicity of the ripples ranged from about 1500 to 3000 nm, and the depth of the ripples ranged from about 50 to 100 nm.

The die was set in a stamping machine, and micro gears were fabricated by punching a copper plate having a thickness of 1 mm with a coating of a lubricant. The fabricated micro gears had a thickness ranging from about 0.85 to 0.90 mm. The reason why the thickness of the micro gears decreased compared with those in the Example 1 is probably that micro pools were not sufficiently formed, and thus, the copper material was less slidable on the die. Many of the micro gears had a mean surface roughness of 200 nm or more and were not glossy.

Although various examples and comparative examples have been described above, ripples can be formed on a stamping tool made of a ceramic material or silicon material. The present invention takes advantage of the property of the gas cluster ion beam that the beam forms ripples with short periodicity while planarizing structures with long periodicity or sharp projections. Thus, the conditions, such as the kind of the gas cluster and the acceleration energy, the materials of the stamping tool and the workpiece and the like are not particularly limited.

The ripples do not need to be formed on the entire area of the stamping tool surface that comes into contact with the workpiece material but can be formed only partially. For example, ripples can be formed only in a part of the stamping tool that is likely to result in a defective shape of the product.

What is claimed is:

1. A method for treating a stamping tool surface of a stamping tool for metal stamping that comprises irradiating the stamping tool surface with a gas cluster ion beam, the stamping tool surface being a surface that comes into contact with a workpiece material, wherein the gas cluster ion beam is irradiated in a direction substantially parallel to a direction of sliding between the stamping tool and the workpiece material, and a plurality of ripples having a stripe shape extending in a direction substantially perpendicular to the direction of sliding are formed thereby on the stamping tool surface, wherein the plurality of ripples formed on the stamping tool surface have depths ranging from 10 to 100 nm and periodicities ranging from 100 to 1000 nm.

2. The method according to claim 1 that comprises fluctuating an angle of axis of irradiation of the gas cluster ion beam with respect to a central axis parallel to the direction of sliding.

* * * * *